June 20, 1933.  S. F. MASHBIR  1,914,973
WEIGHING SCALE
Filed June 2, 1931
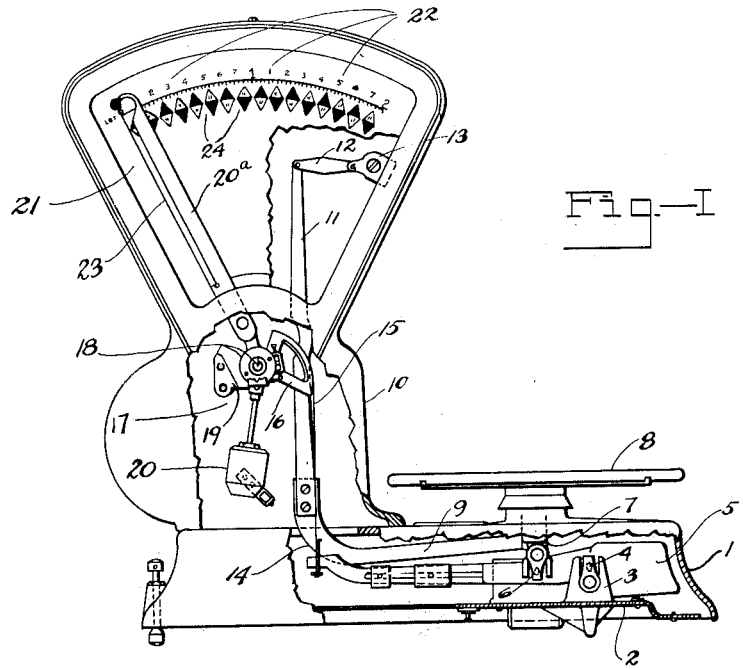
Fig.-I
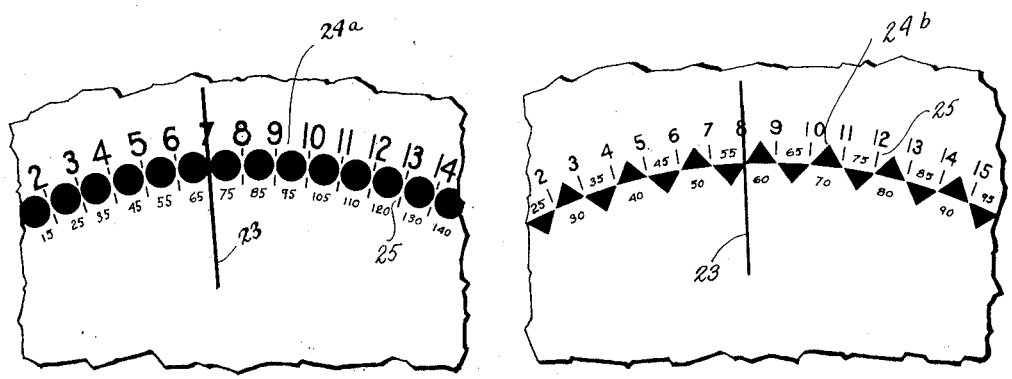
Fig.-II  Fig.-III
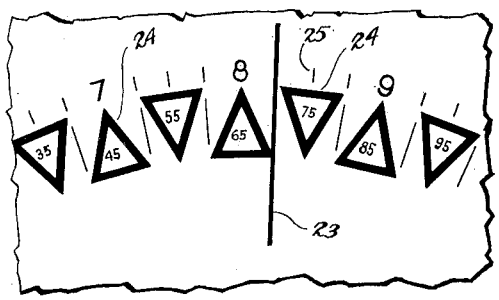
Fig.-IV
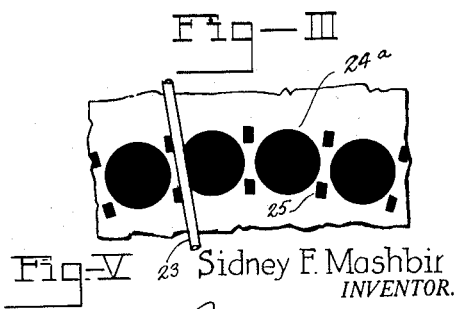
Fig.-V
Sidney F. Mashbir
INVENTOR.
BY C. C. Marshall
ATTORNEY.

Patented June 20, 1933

1,914,973

UNITED STATES PATENT OFFICE

SIDNEY F. MASHBIR, OF WASHINGTON, DISTRICT OF COLUMBIA, ASSIGNOR TO TOLEDO SCALE MANUFACTURING COMPANY, OF TOLEDO, OHIO, A CORPORATION OF NEW JERSEY

WEIGHING SCALE

Application filed June 2, 1931. Serial No. 541,712.

This invention relates to weighing scales and particularly to improved means for indicating the weights of the loads being weighed on such scales. The indicating means for scales of the type hereinafter described comprise generally an indicia bearing chart and an indicator provided with an index line which is either in the form of a thin metallic wire or a silk thread, the chart and indicator being relatively movable. The indicia on the chart consist of graduations, which, in the scale illustrated, radiate from the fulcrum point of the load counterbalancing pendulum, and numerals designating the values of the graduations. The index line on the indicator is also arranged so that its projection bisects this fulcrum point, so that during the movement of the indicator, the graduations will be successively covered by the index line. In many of the heretofore known arrangements of indications, in scales of the type illustrated, the person reading the indication, at times may be undecided whether the line exactly covers the graduation mark or whether it is, what is generally known in the scale industry, on the "slow side" or the "fast side". This depends largely on the keenness of the operator's eyesight.

In weighing the ordinary commodities of commerce, the exact determination of the relative position of the graduation and the index is not of such importance as to require determination as to whether the index is exactly on the center of the graduation, that is, "splitting" or slightly to the "slow" or "fast" side, as the change in the value for such an amount is too small to be taken into consideration. A different situation, however, is presented when such scales are used to determine the amount of postage required for a letter or a parcel. Postal rates are established for full units of weight only, and when a letter or parcel exceeds one weight unit, even by the slightest amount, a charge for the next higher unit is included in the postage. For this reason, scales used for determining such weights should be equipped with charts which enable the person performing the weighing operation to determine with certainty the exact relative position of the graduation and index.

When the weight of a package is in question, the shipper is prone to attach sufficient postage for the next higher weight, to obviate trouble which might arise in case the postage attached is found to be insufficient. The savings which can be made by a merchant who makes a great number of parcel post shipments, when the weighing device permits ready determination of the exact weight, in the course of time are very large; for example, in the eighth parcel post zone, the postage increase for each unit of weight is $.12.

The principal object of the invention is, therefore, the provision of improved means in a weighing device for indicating weights and values.

Another object is the provision, on a weighing scale chart, of a plurality of geometrical figures, in suitable juxtaposition, to denote increments of weights and/or values.

Still another object is the provision, on a weighing scale chart, of a plurality of geometrical figures in lateral spaced relation.

A further object is the provision, on a weighing scale chart, of a plurality of geometrical figures having similar portions juxtaposed.

A still further object is the provision, on a weighing scale chart, of a plurality of geometrical figures having similar portions juxtaposed and in spaced relation with each other.

A still further object is the provision on a force measuring device chart, of a series of graduation lines having a definite thickness and a series of similar geometrical figures terminating on the projections of the edges of the graduations.

These and other objects and advantages will be apparent from the following description in which reference is had to the accompanying drawing illustrating preferred embodiments of the invention and in which similar reference numerals denote similar parts throughout the several views.

In the drawing:—

Figure I is a front elevational view, portions thereof broken away, of a scale embodying the invention.

Figures II, III and IV are enlarged fragmentary portions of force measuring device charts illustrating modifications of the invention; and Figure V is a fragmentary portion of a weighing machine chart embodying the invention and illustrating the optical advantage of the invention.

Referring to the drawing in detail, the scale in which I have shown my invention embodied is a well known type and I will, therefore, describe it in no greater detail than is necessary to properly disclose my invention. Secured to the bottom of a base casing 1 is a plate 2 having upwardly projecting fulcrum stands 3 upon which the fulcrum pivots 4 of a load supporting lever 5, are rockably mounted. A pair of load supporting pivots 6 are also fixed in the lever 5 in spaced relation with the fulcrum pivots 4. These pivots support a spider casting 7 and the thereon mounted load receiver 8. To maintain the condition of level of the load receiver, the spider 7 has an extending arm 9 which curves upwardly into a mechanism enclosing housing 10 fastened to one end of the base casing 1. A check riser 11 is secured to the upwardly turned portion of the extending arm 9 and its upper end is pivotally connected by a check link 12 to an adjustment block 13 secured to the housing 10. The nose end of the lever 5 pivotally engages a stirrup 14 fastened to the lower end of a flexible connection 15 which overlies and is fastened to an eccentric segment 16 which forms part of the load counterbalancing pendulum 17. This pendulum is fulcrumed by means of a pivot 18 on a stationary fulcrum bracket 19, fastened by means of screws to the rear wall of the housing 10, and comprises a pendulum 20 and an indicator 20a which lies immediately in front of an indicia bearing chart 21.

When a load is placed on the platform 8, its force, acting in response to the attraction of gravity, overbalances the lever 5 which turns about its fulcrum pivots 4 and transmits a force proportional to the ratio of the lever to the load counterbalancing pendulum 17 which also is thereby turned from its counterbalanced position about its pivot 18 until the pendulum 19 assumes a position in which its weight moment counterbalances the load on the platform. The position assumed by the pendulum is always in direct proportion to the mass of the load on the platform and thus an index line 23, fastened to the indicator 20, points invariably to the indicium 22 on the chart 21 which represents the correct weight.

As has been previously stated, it is sometimes difficult to note with exactitude whether the index line 23 covers the proper graduation or is slightly slow or fast. I have, therefore, provided a series of geometrical figures 24 on the face of the chart in addition to graduation lines 25. These graduation lines have a width which is not greater than the thickness of the index line 23 and the geometrical figures are spaced in the areas defined by the edges or the graduation lines so that when the index line 23 is in exact registry with one of the graduation marks, points of adjacent geometrical figures will appear to touch the edges of the index line 23 (Figure IV) and the slightest movement of the index line 23 from the exact registry, will be very obvious to the operator of the scale as on one side the white background will be visible between the point of the geometrical figure 24 and the edge of the index line 23, and on the other side a portion of the point will be covered up. This destroys the symmetry of appearance of the geometrical figure and is much more noticeable than the mere relationship between the index line 23 and a graduation mark (Figure V), as, due to its shape, the area of the geometrical figure 24 covered by the index line increases rapidly.

Figures II and III show slight modifications of the invention, the difference residing in the shape of the geometrical figures only, and no further explanation is necessary.

Although I have shown the invention embodied in a fan type scale, it will be readily seen that it is of great value in connection with scales having chart indications of any kind and it is to be understood that the invention is susceptible to variation, modification and change within the spirit and scope of the subjoined claims.

Having described my invention, I claim:

1. In a device of the class described, in combination, a relatively movable chart and index, said chart bearing optically distinctive areas having portions jutting toward each other and clear spacings between the adjacent termini of such portions, the width of said spacings at their narrowest places being equal to the thickness of a portion of said index, and means for moving said portion of said index selectively into and out of registration with the narrowest places of said spacings, said chart also bearing linear graduations, the narrowest place of each of said spacings being in alignment with one of said linear graduations.

2. In a device of the class described, in combination, a relatively movable chart and index, said chart bearing optically distinctive areas having portions jutting toward each other and clear spacings between the adjacent termini of such portions, the width of said spacing at their narrowest places being equal to the thickness of a portion of said index, and means for moving said portion of said index selectively into and out of registration with the narrowest places of said spacings, said chart also bearing linear graduations, the narrowest place of each of said spacings being in alignment with one of said linear graduations, the width of each of said linear graduations being equal to the width of the narrowest place in the spacing in alignment therewith.

SIDNEY F. MASHBIR.